(12) United States Patent
Tanghe et al.

(10) Patent No.: US 9,790,399 B2
(45) Date of Patent: Oct. 17, 2017

(54) CLEAR COAT COMPONENT

(71) Applicant: AXALTA COATING SYSTEMS IP CO., LLC, Wilmington, DE (US)

(72) Inventors: Leen Tanghe, Kontich (BE); Jozef Huybrechts, Turnhout (BE); Ann Vaes, Belgium (BE)

(73) Assignee: AXALTA COATINGS SYSTEMS IP CO. LLC, Wilmington, DE (US)

( * ) Notice: Subject to any disclaimer, the term of this patent is extended or adjusted under 35 U.S.C. 154(b) by 0 days.

(21) Appl. No.: 14/336,172

(22) Filed: Jul. 21, 2014

(65) Prior Publication Data

US 2015/0031807 A1    Jan. 29, 2015

Related U.S. Application Data

(60) Provisional application No. 61/857,317, filed on Jul. 23, 2013.

(51) Int. Cl.

| | |
|---|---|
| *C09D 177/12* | (2006.01) |
| *C08K 5/52* | (2006.01) |
| *C08K 5/13* | (2006.01) |
| *C09D 133/12* | (2006.01) |
| *C09D 167/00* | (2006.01) |
| *C08G 18/62* | (2006.01) |
| *C09D 175/02* | (2006.01) |
| *C09D 175/04* | (2006.01) |
| *C08G 18/38* | (2006.01) |
| *C08G 18/40* | (2006.01) |
| *C08K 5/524* | (2006.01) |

(52) U.S. Cl.
CPC ....... *C09D 177/12* (2013.01); *C08G 18/3821* (2013.01); *C08G 18/4063* (2013.01); *C08G 18/6225* (2013.01); *C08K 5/13* (2013.01); *C08K 5/52* (2013.01); *C08K 5/524* (2013.01); *C09D 133/12* (2013.01); *C09D 167/00* (2013.01); *C09D 175/02* (2013.01); *C09D 175/04* (2013.01)

(58) Field of Classification Search
CPC ........ C08G 63/12; C08G 63/16; C08G 18/00; C08G 18/08; C08G 63/78; C08G 18/792; C08G 18/3821; C08G 18/246; C08G 18/2815; C08K 5/524; C08K 5/005; C08K 5/13; C08K 5/18; C09D 175/04; C09D 175/12; Y10T 428/31551; Y10T 428/31554

See application file for complete search history.

(56) References Cited

U.S. PATENT DOCUMENTS

| | | | | |
|---|---|---|---|---|
| 3,115,465 A | * | 12/1963 | Knapp | ............... C08K 5/13 252/400.23 |
| 4,677,154 A | * | 6/1987 | Narayan | .............. C08K 5/005 524/710 |
| 5,085,698 A | | 2/1992 | Ma et al. | |
| 5,126,170 A | | 6/1992 | Zwiener et al. | |
| 6,436,477 B2 | * | 8/2002 | Laginess | ................ 427/372.2 |
| 2004/0147648 A1 | * | 7/2004 | Corcoran | .......... C08G 18/3821 524/186 |
| 2006/0155148 A1 | * | 7/2006 | Lenges | ................ C07C 215/20 564/453 |
| 2010/0272886 A1 | * | 10/2010 | Vaes | ................. C08G 18/4063 427/140 |
| 2012/0258269 A1 | * | 10/2012 | Gehringer | ............ C08G 18/00 428/36.9 |

FOREIGN PATENT DOCUMENTS

| | | | | |
|---|---|---|---|---|
| DE | WO 2011083000 A1 | * | 7/2011 | ............ C08G 18/00 |
| EP | 0470461 A2 | | 2/1992 | |
| WO | 2004063242 A1 | | 7/2004 | |
| WO | 2005089085 A2 | | 9/2005 | |

OTHER PUBLICATIONS

European Patent Office, European Extended Search Report for Application No. 14178173.2, dated Nov. 21, 2014.

* cited by examiner

*Primary Examiner* — Christopher M Rodd
(74) *Attorney, Agent, or Firm* — Lorenz & Kopf LLP

(57) ABSTRACT

A curable clear coat component for use in a two-component clear coat coating composition system is provided. The curable clear coat component comprises A) a polyaspartic acid ester or a hydroxyl functional binder or a combination of both, and B) an antioxidant component comprising B1) a sterically hindered phenol antioxidant, and B2) an organophosphite antioxidant.

4 Claims, No Drawings

CLEAR COAT COMPONENT

CROSS-REFERENCE TO RELATED APPLICATION

This application claims the benefit of U.S. Provisional Application No. 61/857,317, filed Jul. 23, 2013, which is incorporated herein by reference in its entirety.

TECHNICAL FIELD

The technical field relates to a color stabilized curable clear coat component comprising an isocyanate reactive compound and a combination of antioxidants. The clear coat component can be used as curable component of a two-component polyisocyanate-containing clear coat coating composition system.

BACKGROUND

Hydroxyl functional binder and/or aspartate-based coating compositions are well known in the art. For example, EP 0 403 921 describes coating compositions with binders based on a polyisocyanate component and an isocyanate-reactive component containing specific secondary polyamines. These secondary polyamines are also called polyaspartic acid derivatives and are based on primary polyamines and diesters of maleic or fumaric acid. EP 0 470 461 also describes coating compositions for vehicle refinish applications containing a polyisocyanate component and an isocyanate-reactive secondary diamine prepared from 3,3'-dimethyl 4,4'-diamino dicyclohexylmethane and maleic diethylester.

A general disadvantage of the above aspartate-based coating compositions is that the component containing the curable aspartate remarkably discolours on storage. Clear coat components based on hydroxyl functional binders tend to discolour at storage, too. This yellowing and discoloring of the aspartate- and/or hydroxyl-binder-containing component is clearly not desired.

WO 2005/089085 discloses a hardener composition for use as a cross-linking component of a two-component polyurethane coating composition comprising a polyisocyanate, a catalyst for the curing reaction, a first antioxidant which is a sterically hindered phenol or a secondary aryl amine, and a second antioxidant which is an organophosphite. The combination of antioxidants stabilizes the color of a solution of a polyisocyanate in the presence of a catalyst.

U.S. Pat. No. 4,677,154 discloses a process for improving the color stability of polyurethanes, wherein the polyurethane reaction is conducted in the presence of an additive stabilizer comprising 2,6-di-(t-butyl)-p-cresol (BHT) and a compound selected from specific phosphites, diphosphonites, isocyanurates and other compounds such as di-stearyl thiodipropionate, di-stearyl pentaerythritol and 4,4'-methylene bis(2,6-di-t-butylphenol). The use of the additive package prevents discoloration of the thermoplastic polyurethane caused by discoloration of the polyisocyanate.

WO 2004/063242 discloses coating compositions containing aspartic compounds and polyisocyanate curing agents. The coating compositions contain a di-substituted phenol antioxidant or a hydroperoxide decomposer. Presence of the antioxidant or decomposer leads to coatings with good resistance to UV light.

However, it has not hitherto been possible to provide a satisfactory solution to avoid discoloration/yellowing of hydroxyl functional binder and/or aspartate-based clear coat components on storage.

Thus, there is accordingly still a need for hydroxyl functional binder and/or aspartate-based clear coat components which do not show discoloration and yellowing on storage at room temperature as well as at elevated temperatures, e.g., of up to 50° C. The clear coat components shall be color stable for a time period of at least 12 months, while at the same time good technological properties of applied films formed by a two-component coating composition system containing the curable clear coat component and a polyisocyanate cross-linking component shall be maintained. In addition, other objects, desirable features and characteristics will become apparent from the subsequent summary and detailed description, and the appended claims, taken in conjunction with the accompanying drawings and this background.

SUMMARY

The invention relates to a curable clear coat component for use as a curable component of a two-component clear coat coating composition system, said curable clear coat component comprises:
A) at least one compound with functional groups with active hydrogen, preferably at least one polyaspartic acid ester or at least one hydroxyl functional binder or a combination of both, and
B) an antioxidant component comprising
B1) at least one sterically hindered phenol antioxidant and
B2) at least one organophosphite antioxidant.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It will be appreciated that certain features of the clear coat components that are, for clarity, described above and below in the context of separate embodiments may also be provided in combination in a single embodiment. Conversely, various features of the clear coat components that are, for brevity, described in the context of a single embodiment may also be provided separately or in any sub-combination. In addition, references in the singular may also include the plural (for example, "a" and "an" may refer to one, or one or more) unless the context specifically states otherwise.

The term (meth)acrylic as used here and hereinafter should be taken to mean methacrylic and/or acrylic.

Unless stated otherwise, all molecular weights (both number and weight average molecular weight) referred to herein are determined by GPC (gel permeation chromatography) using polystyrene as the standard and tetrahydrofurane as the liquid phase.

Organic solvent-based coating compositions are coating compositions wherein organic solvents are used as solvents or thinner when preparing and/or applying the coating composition. Usually, solvent-based coating compositions contain, for example, about 20 to about 90% by weight of organic solvents, based on the total amount of the coating composition.

A two-component clear coat coating composition system comprises two components—the curable component and the cross-linking component. Both components are reactive towards one another and must be stored separately from one another prior to application in order to avoid a premature reaction. Generally both components may only be mixed together shortly before application.

A curable component as used herein, specifically the curable clear coat component contemplated herein, is the component of a two-component clear coat coating composition system containing monomeric, oligomeric and/or polymeric compounds having cross-linkable functional groups with active hydrogen, such as hydroxyl or secondary amino groups.

A crosslinking component as used herein is the component of a two-component clear coat coating composition system containing a polyisocyanate cross-linker.

The curable clear coat component contemplated herein will be explained in greater detail in the following.

The curable clear coat component is an organic solvent based curable component for use in two-component organic solvent-based polyurethane/polyurea clear coat coating composition systems.

Component A

In an exemplary embodiment, the curable clear coat component comprises at least one compound with functional groups with active hydrogen, for example, comprising a polyaspartic acid ester or a hydroxyl functional binder or a combination of both.

The polyaspartic acid ester can be a polyaspartic acid ester which corresponds to formula (1):

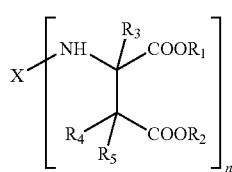

Formula (I)

wherein X represents an n-valent organic group, preferably a divalent hydrocarbon group, obtained by removal of the amino groups from a primary polyamine or polyetheramine; and R1 and R2 are the same or different organic groups which are inert towards isocyanate groups. R3, R4 and R5 are the same or different and represent hydrogen or organic groups that are inert towards isocyanate groups, and n represents an integer with a value of at least 2, preferably 2 to 4 and more preferably 2. In an embodiment, X represents a divalent hydrocarbon group obtained by removal of the amino groups from the primary polyamines and polyether amines mentioned below and particularly represents a divalent hydrocarbon group obtained by removal of the amino groups from the exemplary primary polyamines mentioned below. R1 and R2 are the same or different residues and are, for example, methyl, ethyl or n-butyl and R3, R4 and R5 are, for example, hydrogen.

An organic group that is inert towards isocyanate groups is, for example, an organic group that is inert towards isocyanate groups at a temperature of 150° C. or less. Polyaspartic acid esters of formula (I) are prepared in known manner by reacting the corresponding primary polyamines or polyether amines corresponding to the formula X—(NH2)n with optionally substituted maleic or fumaric acid esters corresponding to the formula R1OOC—CR3=CR4-COOR2. X, R1, R2, R3, R4 and n have the meaning as defined above for formula (1).

Primary polyamines or polyether amines are suitable for preparing the polyaspartic acid esters as those give a favorable solids/viscosity ratio in order to meet the desired VOC of 3.5 lbs/gal or below of the final formulation. A molar excess of those polyamines or polyether amines can also be reacted with di- and polyisocyanates to prepare amine-terminated ureas or polyether ureas, or can be reacted with isocyanate-terminated polyesters, polycarbonates or polyethers obtained from the corresponding polyester, polycarbonate or polyether di- or polyols, and subsequent conversion of the terminal amine groups into an aspartate acid ester through reaction with a maleic and/or fumaric acid ester.

Suitable primary polyamines include ethylene diamine, 1,2-diaminopropane, 1,4-diaminobutane, 1,3-diaminopentane, 1,6-diaminohexane, 2,5-diamino-2,5-dimethylhexane, 2,2,4- and 2,4,4-trimethyl-1,6-diaminohexane, 1,11-diaminoundecane, 1,12-diaminododecane, 1,3- and 1,4-cyclohexane diamine, 1-amino-3,3,5-trimethyl-5-aminomethylcyclohexane, 2,4- and 2,6-hexahydrotoluylene diamine, 2,4'- and 4,4'-diamino-dicyclohexyl methane and 3,3'-dialkyl-4,4'-diaminodicyclohexylmethanes, such as 3,3'-dimethyl-4,4'-diaminodicyclohexyl methane and, 3'-diethyl-4,4'-diaminodicyclohexylmethane, 2,4,4'-triamino-5-methyldicyclohexylmethane, 2-methyl-1,5-pentanediamine and 1,3- and 1,4 xylylenediamine. Preferred primary polyamines are amino-3,3,5-trimethyl-5-aminomethylcyclohexane (IPDI), 2,4'- and 4,4'-diamino-dicyclohexyl methane, 3,3'-dialkyl-4,4'-diaminodicyclohexylmethanes such as 3,3'-dimethyl-4,4'-diaminodicyclohexyl methane and 2-methyl-1,5-pentanediamine.

Suitable polyether polyamines are those with aliphatically bonded primary amino groups. The polyether polyamines can have a molecular weight of 148 to 6,000. Examples of suitable polyether polyamines are the products commercially available under the trademark JEFFAMINE® from Huntsman.

Also suitable, though less preferred, are the aromatic polyamines such as 2,4- and 2,6-diaminotoluene and 2,4'- and 4,4'-diaminodiphenylmethane.

Examples of optionally substituted maleic or fumaric acid esters suitable for preparing the polyaspartic acid esters include the dimethyl, diethyl, dibutyl (e.g. di-n-butyl,di-s-butyl,di-t-butyl), diamyl, di-2-ethylhexyl esters and mixed esters based on mixtures of the above and/or other alkyl groups; and the corresponding maleic and fumaric acid esters substituted by methyl in the 2- and/or 3-position. The dimethyl, diethyl and dibutyl esters of maleic acid are preferred, while the diethyl esters are especially preferred.

Other diesters that can be used are those derived from cycloaliphatic, bicycloaliphatic and aromatic alcohols, such as cyclohexanol, benzylalcohol and isoborneol. Long chain monoalcohols such as ether alcohols can also be used, e.g., the reaction products of monoalkyl, cycloalkyl and aryl monoalcohols with ethyleneoxide, propyleneoxide, butyleneoxide, such as monobutylglycol, monohexylglycol, propyleneglycol monobutylether.

Di-aspartic acid esters are preferred.

The preparation of polyaspartic acid ester of formula (I) from the above mentioned starting materials may be carried out, for example, at a temperature of from 0 to 150° C. using the starting materials in such proportions that at least 1, preferably 1, olefinic double bond is present for each primary amino group. Excess of starting materials may be removed by distillation after the reaction. The reaction may be carried out solvent-free or in the presence of suitable organic solvents such as alcohols, ethers, acetates and ketones, e.g., methanol, ethanol, propanol, n-butyl acetate, butylglycol, methylethylketone, dioxane, and mixtures of such organic solvents. Preferred solvents are those which are not reactive with isocyanates.

The hydroxyl-functional binder that can be present in component A may be an oligomeric and/or polymeric compound with a number average molecular weight (Mn) of, e.g., 500 to 200,000 g/mole, preferably of 1,100 to 100,000 g/mole. The binders with hydroxyl groups are for example the polyurethanes, (meth)acrylic copolymers, polyesters and polyethers, known from polyurethane chemistry to the skilled person, which are used in the formulation of, e.g., organic solvent-based coating compositions. They may each be used individually or in combination with one another.

Examples of hydroxyl-functional (meth)acrylic copolymers include all (meth)acrylic copolymers that are suited for solvent-based coating compositions and known to a skilled person. For example, they can be those with a number average molar mass Mn of 1,000-20,000 g/mol, for example, of 1,100-15,000, an acid value of 0-100 mg KOH/g, and a hydroxyl value of 40-400 mg KOH/g, for example, of 60-200 mg KOH/g.

The (meth)acrylic copolymers can be prepared by free-radical polymerization of polymerizable, olefinically unsaturated monomers, optionally, in the presence of oligomeric or polymeric polyester and/or polyurethane resins. Free-radically polymerizable, olefinically unsaturated monomers, which may be used are monomers that, in addition to at least one olefinic double bond, also contain further functional groups and monomers that, apart from at least one olefinic double bond, contain no further functional groups.

Examples of hydroxyl-functional polyester resins that can be used as binder include all polyester resins that are suited for organic solvent-based coating compositions, for example, hydroxyl-functional polyesters with a number average molecular weight of 500-10,000 g/mol, for example, of 1100-8000 g/mol, an acid value of 10-150 mg KOH/g, for example, of 15-50 mg KOH/g and a hydroxyl value of 40-400 mg KOH/g, for example, of 50-200 g/mol. The polyesters may be saturated or unsaturated and they may optionally be modified with fatty acids. The polyesters are produced using known processes with elimination of water from polycarboxylic acids and polyalcohols. Preferred hydroxyl-functional polyester resins are polyester oligomers having a hydroxyl value of 50 to 300 mg KOH/g solid, for example of 80 to 220 mg KOH/g solid, a polydispersity (Mw/Mn) of <2, for example of 1.5 and <1.5 and a number average molecular weight (Mn) of 300 to 4000, for example of 700-1500, having at least three branches, and having at least one hydroxyl group on each of the at least three branches, wherein the polyester oligomer comprises the following components:
  a) at least one polycarboxylic acid anhydride,
  b) at least one polyol having at least three hydroxyl groups and
  c) at least one glycidyl ester of a saturated monocarboxylic acid branched in the alpha position, wherein the saturated monocarboxylic acid branched in the alpha position is selected from a group consisting of alpha-alkylalkane monocarboxylic acid having 7 to 13 carbon atoms in the acid molecule, for example having 9 to 11 carbon atoms in the acid molecule, alpha, alpha'-di-alkylalkane monocarboxylic acids having 7 to 13 carbon atoms in the acid molecule, for example having 9 to 11 carbon atoms in the acid molecule and mixtures thereof Exemplary components a) are hexahydrophthalic anhydride, methylhexahydrophthalic anhydride, trimellitic anhydride and/or phthalic anhydride, exemplary components b) are trimethylolpropane, trimethylolethane, ditrimethylolpropane, monopentaerythritol and/or dipentaerythritol, for example having 9 to 11 carbon atoms in the acid molecule. An example of component c) is the glycidyl ester of versatic acid (neodecanoic glycidyl ester). Exemplary hydroxyl-functional polyester oligomers are obtained by reacting hexahydrophthalic anhydride, methylhexahydrophthalic anhydride, phthalic anhydride and/or trimellitic anhydride with monopentaerythritol and/or dipentaerythritol and with the glycidyl ester of versatic acid.

Examples of suitable hydroxyl-functional polyurethanes include all polyurethane resins that are suited for coating compositions and known to a skilled person. Examples are polyurethanes, for example, with a number average molar mass Mn of 500 to 500,000 g/mole, for example, of 1,100 to 300,000 g/mole, for example, of 5,000 to 300,000 g/mole, an acid value of 0 to 100 mg KOH/g, and a hydroxyl value of 40 to 400 mg KOH/g, for example, of 80 to 250 mg KOH/g. Appropriate polyurethane resins that may be used are, for example, prepared by reacting compounds that are reactive with respect to isocyanate groups and polyisocyanates having at least 2 free isocyanate groups per molecule.

In one embodiment component A) comprises a hydroxyl-functional (meth)acrylic copolymer. In another embodiment component A) comprises a hydroxyl-functional (meth)acrylic copolymer and a polyester oligomer, for example a polyester oligomer as described above. In an embodiment, component A) consists of a hydroxyl-functional (meth)acrylic copolymer or component A) consists of a hydroxyl-functional (meth)acrylic copolymer and a polyester oligomer, specifically a polyester oligomer as described above.

In a further embodiment component A) comprises a polyaspartic acid ester. Component A) can also consist of a polyaspartic acid ester.

In yet a further embodiment component A) comprises a polyaspartic acid ester and a hydroxyl-functional binder, for example, a hydroxyl-functional (meth)acrylic copolymer, optionally in combination with a hydroxyl-functional polyester oligomer. In an embodiment, component A) consists of a polyaspartic 30 acid ester and a hydroxyl-functional binder, for example a hydroxyl-functional (meth)acrylic copolymer, optionally in combination with a hydroxyl-functional polyester oligomer.

Component B

The curable clear coat component contemplated herein comprises an antioxidant component comprising B1) a sterically hindered phenol antioxidant and B2) an organophosphite antioxidant.

Suitable sterically hindered phenol antioxidants B1) include 2,4-dimethyl-6-butylphenol, 4,4'methylene-bis(2,6-di-tert-butylphenol), 2,6-di-tert. butyi-N,N'dimethylamino-p-cresol, butylated hydroxyanisole, 2,6-di-tertbutylphenol, 2,4,6-tri-tertbutylphenol, 2-tert-butylphenol, 2,6-diisopropylphenol, 2-methyl-6-tert-butylphenol, 2,4-dimethyl-6-tertbutylphenol, 4-(N,N-dimethylaminomethyl)-2,8-di-tert-butylphenol, 4-ethyl-2,6-di-tertbutylphenol. Sterically hindered phenols are also commercially available as antioxidants, for example, under the tradename Lrganox®1010 and Lrganox® 1135 from BASF.

According to one embodiment the sterically hindered phenol antioxidant comprises 3,5-di-tert.-butyl-4-hydroxy toluene, also known as butylated hydroxy toluene or in short "BHT".

Suitable organophosphite antioxidants B2) include those organophosphites known for use as antioxidants. In one embodiment, the organophosphite comprises one or more compounds according to the formula (RO)3P, wherein each R is independently alkyl or aryl.

As used herein, the term "alkyl" is a radical of a saturated aliphatic group, including straight chain alkyl groups, branched chain alkyl groups, and cycloalkyl groups, wherein such straight and branched chain alkyl groups may each be optionally substituted with cycloalkyl, such cycloalkyl groups may optionally be substituted with straight or branched chain alkyl groups, and such straight chain alkyl, branched chain alkyl and cycloalkyl groups may each be optionally substituted with aryl, and includes, for example, methyl, ethyl, isopropyl, t-butyl, isodecyl, stearyl, icosyl, cyclohexyl and phenylmethyl.

As used herein, the term "aryl" is a group containing one or more 6-membered unsaturated hydrocarbon rings, wherein the unsaturation may be represented formally by three conjugated double bonds and which may optionally be substituted at one or more carbon atoms of such rings by independently selected alkyl groups, and includes, for example, phenyl, naphthyl, methylphenyl, dimethoxyphenyl, 5-isopropyl-2-methylphenyl, methylphenyl, t-butylphenyl, nonylphenyl.

In one embodiment, each R of formula (RO)3P is independently an alkyl group with 1-30 carbon atoms, e.g. with 5-30 carbon atoms, or an aryl group with 1-30 carbon atoms. Examples of suitable organophosphite antioxidants are triisodecylphosphite, diphenylisodecylphosphite, diphenylisooctylphosphite, trilaurylphosphite tributylphosphite, trioctyl phosphite, triphenylphosphite, trinonylphenylphosphite, tributyltripentylphosphite, tris(2,4-di-tert-butylphenyl)phosphite. In one embodiment, the organophosphite antioxidant comprises a trialkyl phosphite, which is, e.g., one wherein each alkyl group has less than 9 carbon atoms, more specifically 3 to 5 carbon atoms. Examples are tri-n-propyl phosphite, tri-isopropyl phosphite, tri-n-pentyl phosphite, tri-butyl phosphites, such as tri-n-butyl, tri-sec-butyl, tri-iso-butyl, and tri-tert-butyl phosphite. Each of the three alkyl groups in a given molecule may be the same or different. Each alkyl group may be straight-chained or branched. The antioxidant component can comprise the at least one sterically hindered phenol antioxidant B1) and the at least one organophosphite antioxidant B2) in a ratio by weight of about 3.0:0.5 to about 0.5:3.0, for example, of about 2.0:1.0 to about 1.0:2.0, such as, about of 1:1.

According to a preferred exemplary embodiment the antioxidant component comprises BHT as the sterically hindered phenol antioxidant B1) and an organophosphite-antioxidant B2) selected from the group consisting of trisnonylphenylphosphite, triphenylphosphite, triisodecylphosphite, diphenylisodecylphosphite, diphenylisooctylphosphite, trilaurylphosphite and tris(2,4-di-tert-butylphenyl)phosphite. According to a further embodiment the antioxidant component comprises BHT as the sterically hindered phenol antioxidant B1) and the organophosphite antioxidant B2) selected from the group consisting of trisnonylphenylphosphite, triphenylphosphite, triisodecylphosphite, diphenylisodecylphosphite, diphenylisooctylphosphite, trilaurylphosphite and tris(2,4-di-tert-butylphenyl)phosphite in the above ratio by weight.

In a further embodiment, the antioxidant component comprises BHT and trisnonylphenylphosphite or comprises BHT and triphenylphosphite. The antioxidant component can also consist of BHT and trisnonylphenylphosphite or consist of BHT and triphenylphosphite.

The curable clear coat component can comprise about 0.5 to about 4% by weight, for example about 1.0 to about 3.0% by weight, for example about 1.5 to about 2.5% by weight of the antioxidant component B), relative to the total amount of the curable clear coat component. According to one embodiment the curable clear coat component can comprise about 60 to about 95% by weight, for example about 70 to about 90% by weight of the polyaspartic acid ester or the hydroxyl functional binder or the combination of both (A), and about 0.5 to about 4% by weight, for example about 1.0 to about 3.0% by weight of the antioxidant component B), relative to the total amount of the curable clear coat component.

The curable clear coat component can also contain low molecular weight reactive components, so-called reactive thinners, which are able to react with a polyisocyanate cross-linking agent. Examples of these are amino-functional or hydroxyl-functional reactive thinners.

In addition to components A) and B) the curable clear coat component contemplated herein may contain usual components to be used in clear coat compositions, such as additives and organic solvents. The additives and organic solvents are used in usual quantities known to a skilled person.

The organic solvents may originate from the preparation of the binders or they may be added separately. They are organic solvents typical of those used for coating compositions and well known to the skilled person. Examples of suitable organic solvents are aromatic hydrocarbons, such as xylene, Solvesso 100, ketones, such as methylisoamyl ketone, esters, such as n-butylacetate, isobutylacetate and mixtures of these organic solvents.

The additives are the conventional additives, which may be used, in the coating sector, in particular in clear coat coating compositions. Examples of such additives include light protecting agents, e.g., based on benzotriazoles and HALS compounds (hindered amine light stabilizers), leveling agents based on (meth)acrylic homopolymers or silicone oils, rheology-influencing agents, such as, fine-particle silica or polymeric urea compounds, anti-foaming agents, wetting agents, adhesion promoters, curing catalysts for the cross-linking reaction, for example, organic metal salts, such as, dibutyltin dilaurate, zinc naphthenate and compounds containing tertiary amino groups such as triethylamine for the hydroxyl/isocyanate reaction.

According to one embodiment the curable clear coat compound comprises:
A) a polyaspartic acid ester, for example a di-aspartic acid ester, and
B) an antioxidant component consisting of a sterically hindered phenol antioxidant and an organophosphite antioxidant.

The di-aspartic acid ester A) is, for example, a compound corresponding to formula (I) as described above with n representing 2, and in an embodiment, R3 and R4 are hydrogen.

According to a further embodiment the curable clear coat componentcontemplated herein comprises:
A) a hydroxyl functional binder, for example a hydroxyl functional (meth)acrylic copolymer and a hydroxyl functional polyester oligomer, and
B) an antioxidant component consisting of a sterically hindered phenol antioxidant and an organophosphite antioxidant.

The curable clear coat component contemplated herein does not contain a polyisocyanate cross-linking agent, since the polyisocyanate cross-linking agent does not form part of the curable component of a two-component clear coat coating composition system, but instead of that forms part of the cross-linking component of the two-component clear coat coating composition system which needs to be stored separately.

Surprisingly it has been found that the specific combination of antioxidants leads to improved yellowing resistance of the curable clear coat component on long term storage at room temperature and even at elevated temperatures of, for example, up to 50° C. The clear coat components contemplated herein are color stable for periods of time of at least 12 months. Even after 20 weeks storage at 49° C. the clear coat components still have a low color while clear coat components without the antioxidant component got very yellow. Particularly advantageous effects in terms of color stability are given for polyaspartic acid ester based clear coat components, which generally show a stronger tendency to yellow at storage.

The curable clear coat component contemplated herein can be used as the curable component of a two-component clear coat coating composition system. In an exemplary embodiment, the two-component clear coat coating composition system comprises a polyisocyanate-containing cross-linking component. The polyisocyanate cross-linking agents have free isocyanate groups. The polyisocyanates can be any number of organic polyisocyanates with aliphatically-, cycloaliphatically-, araliphatically- and/or aromatically-bound free isocyanate groups. Exemplary polyisocyanates are polyisocyanates or polyisocyanate mixtures with exclusively aliphatically- and/or cycloaliphatically-bound isocyanate groups with an average NCO functionality of 1.5 to 6, preferably 2 to 4.

Examples of particularly suitable polyisocyanates are what are known as "paint polyisocyanates" based on hexamethylene diisocyanate (HOI), 1-isocyanato-3,3,5-trimethyl-5-isocyanatomethyl-cyclohexane (IPDI) and/or bis(isocyanatocyclohexyl)-methane and the derivatives known per se, containing biuret, allophanate, urethane and/or isocyanurate groups of these diisocyanates. Typically, following production, the derivatives are freed from surplus parent diisocyanate, for example by distillation, with only a residue content of less than 0.5% by weight. Triisocyanates, such as triisocyanatononan can also be used.

Sterically hindered polyisocyanates are also suitable. Examples of these are 1,1,6,6-tetramethyl-hexamethylene diisocyanate, 1,5-dibutyl-penta-methyldiisocyanate, p- or m-tetramethylxylylene diisocyanate and the appropriate hydrated homologues.

Generally the polyisocyanates can be isocyanurates, uretdione diisocyanates, biuret group-containing polyisocyanates, urethane group-containing polyisocyanates, allophanate group-containing polyisocyanates, isocyanurate and allophanate group-containing polyisocyanates, carbodiimide group-containing polyisocyanates and polyisocyanates containing acylurea groups.

The curable clear coat component can be combined with a cross-linking component, specifically with a polyisocyanate containing cross-linking component as described above, in order to prepare a two-component clear coat coating composition system. The curable clear coat component and the two-component clear coat coating composition system containing the same can be used in automotive and industrial coating. Particularly the curable clear coat component can be used advantageously in vehicle repair coating where a storage stability of 12 to 36 months is required. Customers working with two-component polyurethane/polyurea coating composition systems desire to work with clear coat components and related polyisocyanate cross-linking components having a low color. Colored or yellow clear coat components are not suited for applications over pigmented base coat layers of light color, for example, over white or silver metallic base coat layers. Thus, clear coat components having a color of, for example, below 190 Hazen, are preferably desired. Generally the clear coat component shall not remarkably discolor during storage in comparison to the initial color of the clear coat component. The clear coat component shall be color stable for a time period of at least 12 months, while at the same time good technological properties of applied films formed by a two-component clear coat coating composition system containing the curable clear coat component and a polyisocyanate crosslinking component shall be maintained. In particular the initial hardness of the applied coating film shall not be reduced after aging of the clear coat component versus aged clear coat components without antioxidant additives. The above desired properties are achieved with the curable clear coat component contemplated herein. Clear coat components are color stable, i.e., still have a low color after storage for about 20 weeks at about 49° C. as well as after storage for about 12 months and above at room temperature (23° C.).

The curable clear coat component can also be used in any other field of application where a long-term stability in terms of discoloration and yellowing is required.

The invention will be explained in more detail on the basis of the examples below. All parts and percentages are on a weight basis unless otherwise indicated.

EXAMPLES

1. Preparation of a Curable Clear Coat Component Based on Polyaspartic Acid Ester A clear coat component (CC1) has been formulated with the polyaspartic acid ester Desmophen® NH1420. The ingredients are listed in Table 1.

TABLE 1

| Ingredient | | % by weight |
|---|---|---|
| Desmophen\JYNH1420 (Bayer) | Polyaspartic acid ester | 65.00 |
| n-Butylacetate | Solvent | 27.38 |
| Propyleneglycol methylether | Solvent | 2.10 |
| Butylglycol acetate | Solvent | 2.00 |
| TinuvinVY 384 (BASF) | UV absorber, benzotriazole type | 2.40 |
| TinuvinQl) 292 (BASF) | Hindered amine | 0.92 |
| Baysilone ® Ol) OL17 (Borchers) | Silicon-based flow additive | 0.20 |

CC1 has been modified with various antioxidant compounds and combinations of antioxidants. Type and amount of antioxidants as well as test results are shown in Table 2. A comparative clear coat component CC1 without antioxidants has also been tested.

TPP: triphenylphosphite
TNPP: trisnonylphenyl phosphite
BHT: 3,5-di-tert.-butyl-4-hydroxy toluene
lrganox 1135: Benzenepropanoic acid, 3,5-bis(1,1-dimethylethyl)-4-hydroxy-, C7-9-branched alkyl esters.

TABLE 2

| Clear coat | | Hazen after storage at 49° C. | |
|---|---|---|---|
| compound | Initial Hazen | 2 weeks | 8 weeks |
| Comparison - CC1 Without antioxidant | 71 | 155 | 267 |
| Comparison - CC1 With antioxidant | | | |
| 1.0% TPP | 73 | 137 | 220 |
| 2.0% TPP | 96 | 257 | 454 |

TABLE 2-continued

| Clear coat compound | Hazen after storage at 49° C. | | |
|---|---|---|---|
| | Initial Hazen | 2 weeks | 8 weeks |
| 0.7% TNPP | 75 | 128 | 181 |
| 1.0% TNPP | 83 | 134 | 190 |
| 2.0% TNPP | 86 | 139 | 207 |
| 0.7% triisodecylphosphite | 71 | 111 | 156 |
| 1.0% triisodecylphosphite | 73 | 112 | 157 |
| 2.0% triisodecylphosphite | 84 | 135 | 194 |
| 1.0% Irganox 1135 | 83 | 142 | 199 |
| 2.0% Irganox 1135 | 82 | 144 | 204 |
| 0.7% BHT | 75 | 137 | 246 |
| 1.0% BHT | 76 | 134 | 236 |
| 2.0% BHT | 76 | 135 | 246 |
| Exemplary Embodiments - CC1 | | | |
| 1.0% TPP + 1.0% BHT | 73 | 103 | 118 |
| 2.0% TPP + 2.0% BHT | 74 | 104 | 123 |
| 1.0% TPP + 1.0% Irganox1135 | 85 | 127 | 162 |
| 0.7% TNPP + 1.0% BHT | 82 | 122 | 150 |
| 1.0% TNPP + 1.0% BHT | 72 | 98 | 120 |
| 1.0% TNPP + 2.0% BHT | 83 | 122 | 148 |
| 1.0% TNPP + 1.0% BHT + 1.0% TEPA | 77 | 102 | 129 |
| 1.0% TNPP + 1.0% Irganox1135 | 82 | 128 | 164 |
| 1.0% triisodecyl-phosphite + 1.0% BHT | 72 | 98 | 120 |

The color stability of the polyaspartatecontaining clear coat component could significantly be improved by the addition of an antioxidant compound contemplated herein compared with the same clear coat component without antioxidants and with the same clear coat component with comparative antioxidants. The improved color stability could be improved after storage of the samples for a time period of about 4 and about 8 weeks at about 49° C.

Additional long term storage tests have been performed with an analogous clear coat compound, with the only difference that a different batch of the polyaspartic compound has been used (CC2).

TABLE 3

| Clear coat Compound | Hazen after Storage at 49° C. | | | | |
|---|---|---|---|---|---|
| | Initial Hazen | 4 weeks | 8 weeks | 12 weeks | 16 weeks | 20 weeks |
| Comparison - CC2 without antioxidant | 76 | 164 | 356 | 620 | 834 | >1000 |
| Exemplary Embodiments - CC2 | | | | | | |
| 1.0% TPP + 1.0% BHT | 80 | 105 | 129 | 150 | 170 | 193 |
| 1.0% TNPP + 1.0% BHT | 77 | 103 | 128 | 151 | 167 | 196 |

The results in Table 3 demonstrate that the addition of the antioxidant compound as described herein had a remarkable effect on the color long term stability of the clear coat compound: after 20 weeks storage at 49° C. the samples still had a low color while the comparative sample has been very yellow.

TABLE 4

| Clear coat compound | Hazen after storage at 23° C. | | |
|---|---|---|---|
| | Initial Hazen | 4 weeks | 8 weeks |
| Comparison - CC2 without antioxidant | 90 | 200 | 304 |
| Exemplary Embodiment - CC2 | | | |
| 1.0% TPP | 93 | 190 | 256 |
| 1.0% TNPP | 91 | 167 | 207 |
| 1.0% BHT | 88 | 165 | 236 |
| 1.0% TPP + 1.0% BHT | 93 | 163 | 202 |
| 1.0% TNPP + 1.0% BHT | 92 | 152 | 188 |

The results in Table 4 show that the addition of the antioxidant compound also improved the color stability of the clear coat compound after storage at room temperature (23° C.). It had also been found that results on color stability for the comparative CC2 and CC2 as contemplated herein after storage for 12 months and above at room temperature (23° C.) correlate with color stability for the comparative CC2 and CC2 as contemplated herein after storage for 20 weeks at 49° C.

TABLE 5

| Clear coat compound | Hazen after storage at 49° C. | | |
|---|---|---|---|
| | Initial Hazen | 4 weeks | 8 weeks |
| Comparison - CC2 without antioxidant | 72 | 198 | 405 |
| Comparison - CC2 with antioxidant | | | |
| 1.0% Sanco HCA | 76 | 406 | 726 |
| 1.0% TNPP + 1.0% Sanco HCA | 75 | 214 | 584 |
| 1.0% TPP + 1.0% Sanco HCA | 73 | 204 | 306 |

The comparative results in Table 5 show that antioxidants or antioxidant combinations different from the combination as contemplated herein do not improve the color stability of the clear coat compound after storage at 49° C. to the desired extent, but even show worse results compared with the clear coat compound without antioxidants.

2. Preparation of Curable Clear Coat Component Based on Hydroxyl-functional Binders Clearcoat components (CC3) have been formulated with a blend of a low acid number and high acid number hydroxyl-functional (meth)acrylic copolymer and a hydroxyl-functional polyester oligomer in a ratio by weight of 85:15. This clear coat compound had a solids content of about 54% by weight.

TABLE 6

| CC3 | | | % by weight |
|---|---|---|---|
| hydroxyl-functional polyester (1) | OH-functional binder | | 9.840 |
| low acid number (meth)acrylic copolymer (2) + high acid number (meth) acrylic copolymer (3) | OH-functional binder | | 76.690 |
| n-Butylacetate | Solvent | | 3.242 |
| Methyliso amylketone | Solvent | | 6.340 |
| Butylcarbitol | Solvent | | 1.200 |
| Tinuvin ® 1130 | UV absorber, benzotriazole type | BASF | 0.920 |
| Tinuvin ® 292 | Hindered amine light stabilizer | BASF | 0.460 |
| Byk331 | Silicone based surface additive | Byk Chemie | 0.110 |
| Byk361 | Acrylic levelling additive | Byk Chemie | 0.390 |
| DBTDL | Catalyst | | 0.068 |
| 20% DABCO Solution | Catalyst | | 0.290 |
| Acetic acid Solution | Catalyst | | 0.450 |

(1) Preparation of Hydroxyl-functional Polyester 160.16 g of butylacetate, 136.00 g of monopentaerythritol and 504.00 g of methylhexahydrophthalic anhydride were loaded in a glass reactor and heated to reflux until dissolved (140-160° C.). Afterwards, 750 g of neodecanoic acid glycidyl ester (Cardura E1OP from Hexion) were added, followed by 1.39 g of dibutyl tin dilaurate dissolved in 8.61 g of butylacetate. The mixture was further refluxed at 175° C. until the acid number was below 3. Then 177.33 g of butylacetate were added. The total reaction time was about 3 hours.

The resulting polymer solution had a solids content of 80.5% by weight (1h, 105° C.), a viscosity of X measured by Gardner-Holdt, an acid value of 2.8 mg KOH/g and Mn/Mw of 1190/1460 measured by Gel Permeation Chromatography.

(2) Preparation of Low Acid Number (Meth)Acrylic Copolymer

A 2 liter three-necked ground glass flask fitted with an agitator, contact thermometer, dropping funnel and spherical condenser is charged with 132.7 parts by weight of solvent naphtha (onset of boiling:164° C.) and heated to about 160° C. with stirring and reflux cooling. A monomer mixture of 185.8 parts by weight of styrene, 53.1 parts by weight of methyl methacrylate, 106.2 parts by weight of 2-hydroxyethyl methacrylate, 185.8 parts by weight of isobutylmethacrylate, 0.9 parts by weight of methcrylic acid, 8.9 parts by weight of solvent naphtha, 24.9 parts by weight of xylene and 4.4 parts by weight of di-tert.-butyl peroxide were added continuously from the dropping funnel over a period of 3 hours while keeping at 160° C. After the addition, the monomer-mixing vessel and the dropping funnel were rinsed with 17.8 parts by weight of xylene and the contents were added to the reaction mixture. The reaction mixture was then held at reflux for 1 hour. The mixture was then cooled to 100° C., diluted with 175.3 parts by weight of xylene, 53.1 parts by weight of solvesso 100 and 52.2 parts by weight of methylisobutylketone.

The resulting polymer solution had a solids content of 53% (1h, 105° C.), a viscosity of X-1/4measured by Gardner-Holdt.

(3) Preparation of High Acid Number (Meth)Acrylic Copolymer

A 6 liter three-necked ground glass flask fitted with an agitator, contact thermometer, dropping funnel and spherical condenser was charged with 440 parts by weight of solvent naphtha (onset of boiling:164° C.) and 281.64 parts by weight of neodecanoic acid glycidyl ester (Cardura E10P from Hexion) and heated to 170-175° C. with stirring and reflux cooling. A monomer mixture of 672.36 parts by weight of 25 styrene, 684.72 parts by weight of isobornyl methacrylate, 490.04 parts by weight of 2-hydroxyethyl methacrylate, 154.80 parts by weight of acrylic acid 223.56 parts of solvent naphtha and 57.00 parts by weight of di-tert.-butyl peroxide was added continuously from the dropping funnel over a period of 5 hours while keeping the temperature at 170-175° C. After the addition, the monomer mixing vessel and the dropping funnel were rinsed with 53.84 parts by weight of solvent naphtha and the contents were added to the reaction mixture. The reaction mixture was then hold at reflux for one hour. The mixture was then cooled to 100° C. and diluted with 942.04 parts by weight of methylisoamyl ketone.

The resulting polymer solution had a solids content of 57.5% by weight (1h, 105° C.), a viscosity of K measured by Gardner-Holdt, an acid value of 23 mg KOH/g and Mn/Mw of 2000/4400 measured by Gel Permeation Chromatography.

CC3 has been modified with various antioxidant compounds based on a sterically hindered phenol and an organophosphite. Type and amount of antioxidants as well as test results are shown in Table 7. A comparative clear coat component CC3 without antioxidants has also been tested.

TABLE 7

| Clear coat compound | | Hazen after storage at 49° C. | |
|---|---|---|---|
| | Initial Hazen | 4 weeks | 8 weeks |
| Comparison - CC3 without antioxidant | 50 | 99 | 135 |
| Comparison - CC3 with antioxidant | | | |
| 1.0% TPP | 52 | 66 | 91 |
| 1.0% TNPP | 53 | 76 | 99 |
| 1.0% triisodecylphosphite | 49 | 91 | 116 |
| 1.0% BHT | 51 | 108 | 203 |
| 2.0% BHT | 50 | 133 | 268 |
| Exemplary Embodiments - CC3 | | | |
| 1.0% TPP + 1.0% BHT | 52 | 54 | 76 |
| 1.0% TNPP + 1.0% BHT | 51 | 62 | 89 |

As shown in Table 7 usage of the antioxidant compound as contemplated herein has not only improved the color stability of a polyaspartic acid based clear coat component, but also the color stability of a clear coat component based on a combination of hydroxyl-functional acrylic copolymer and a hydroxyl-functional polyester oligomer.

Test Method:

The color has been measured in the Hazen scale (based on ASTM 01209) on the BYK LCSIII device.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A curable clear coat component for use in a two-component clear coat coating composition system, said curable clear coat component comprising:

A) a combination of a polyaspartic acid ester and a hydroxyl functional binder, wherein the polyaspartic acid ester is a compound of formula (I)

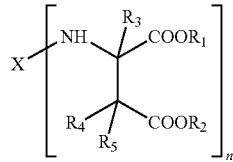

wherein X represents an n-valent organic group obtained by removal of the amino groups from a primary polyamine or polyetheramine; R1 and R2 are the same or different organic groups which are inert towards isocyanate groups, R3, R4 and R5 are the same or different and represent hydrogen or organic groups that are inert towards isocyanate groups; and n represents an integer with a value of 2 or 3;

wherein the hydroxyl functional binder comprises a combination of a hydroxyl-functional (meth)acrylic copolymer, characterized as having a number average molar mass Mn of 1,000-20,000 g/mol, an acid value of 0-100 mg KOH/g, and a hydroxyl value of 40-400 mg KOH/g, and a polyester oligomer, wherein the polyester oligomer comprises: (i) at least one polycarboxylic acid anhydride, (ii) at least one polyol having at least three hydroxyl groups, and (iii) at least one glycidyl ester of a saturated monocarboxylic acid branched in the alpha position, wherein the saturated monocarboxylic acid branched in the alpha position is selected from a group consisting of: alpha-alkylalkane monocarboxylic acid having 7 to 13 carbon atoms in the acid molecule, alpha, alpha'-dialkylalkane monocarboxylic acids having 7 to 13 carbon atoms in the acid molecule, and mixtures thereof; and B) an antioxidant component comprising:
B1) a sterically hindered phenol antioxidant comprising butylated hydroxy toluene (BHT) and
B2) an organophosphite antioxidant comprising tris-nonylphenylphosphite (TNPP) or triphenylphosphite (TPP), wherein the component A) is present in an amount of about 60% to about 95% by weight of the overall curable clear coat component, wherein the antioxidant component B) is present in an amount of 1.5% to 2.5% by weight of the overall curable clear coat component, and wherein the antioxidant component B) comprises the sterically hindered phenol antioxidant B1) and the organophosphite antioxidant B2) in a ratio by weight of about 3.0:0.5 to about 0.5:3.0, wherein the curable clear coat component excludes a polyisocyanate cross-linking agent.

2. The curable clear coat component of claim 1, wherein the component A) is present in an amount of about 70% to about 90% by weight of the overall curable clear coat component, and wherein the antioxidant component B) comprises the sterically hindered phenol antioxidant B1) and the organophosphite antioxidant B2) in a ratio by weight of about 2.0:1.0 to about 1.0:2.0.

3. The curable clear coat component of claim 2, wherein the polyester oligomer comprises as component (i): hexahydrophthalic anhydride, methylhexahydrophthalic anhydride, trimellitic anhydride and/or phthalic anhydride; as component (ii): trimethylolpropane, trimethylolethane, ditrimethylolpropane, monopentaerythritol and/or dipentaerythritol; and as component (iii): the glycidyl ester of versatic acid (neodecanoic glycidyl ester).

4. The curable clear coat component of claim 1, wherein the organophosphite antioxidant component B2) consists of triphenylphosphite.

* * * * *